(12) United States Patent
Olson et al.

(10) Patent No.: US 8,056,009 B2
(45) Date of Patent: Nov. 8, 2011

(54) SYSTEM FOR INITIATING COMMUNICATION BETWEEN A USER INTERFACE AND A VISION PROCESSOR

(75) Inventors: Steven Olson, Portland, OR (US);
Steven Webster, Tigard, OR (US);
Jordan Holt, Portland, OR (US); John McGarry, Tigard, OR (US)

(73) Assignee: Cognex Technology and Investment Corporation, Natick, MA (US)

( * ) Notice: Subject to any disclaimer, the term of this patent is extended or adjusted under 35 U.S.C. 154(b) by 0 days.

(21) Appl. No.: 09/873,163

(22) Filed: Jun. 2, 2001

(65) Prior Publication Data

US 2011/0041067 A1 Feb. 17, 2011

(51) Int. Cl.
*G06F 3/00* (2006.01)
(52) U.S. Cl. ........ 715/733; 715/760; 715/763; 715/771; 715/769
(58) Field of Classification Search .......... 345/952, 345/771, 419, 700, 733, 763, 769; 717/1; 715/700, 771, 733, 763, 769, 760
See application file for complete search history.

(56) References Cited

U.S. PATENT DOCUMENTS

| | | | |
|---|---|---|---|
| 5,235,680 A | | 8/1993 | Bijnagte |
| 5,481,712 A | | 1/1996 | Silver et al. |
| 5,537,104 A | * | 7/1996 | Van Dort et al. ......... 340/825.52 |
| 5,742,504 A | * | 4/1998 | Meyer et al. .................... 700/83 |
| 5,745,126 A | * | 4/1998 | Jain et al. ..................... 382/154 |
| 5,821,993 A | | 10/1998 | Robinson |
| 5,838,916 A | | 11/1998 | Domenikos et al. |
| 5,235,680 A | | 6/1999 | Bijnagte |
| 5,911,044 A | | 6/1999 | Lo et al. |
| 5,940,296 A | * | 8/1999 | Meyer ............................ 700/83 |
| 5,956,509 A | | 9/1999 | Kavner |
| 5,991,760 A | | 11/1999 | Gauvin et al. |
| 6,058,434 A | | 5/2000 | Wilt et al. |
| 6,094,684 A | | 7/2000 | Pallmann |
| 6,138,140 A | | 10/2000 | Yokote |
| 6,144,375 A | * | 11/2000 | Jain et al. ................... 715/500.1 |

(Continued)

FOREIGN PATENT DOCUMENTS

WO WO 99/48000 9/1999

(Continued)

OTHER PUBLICATIONS

Matrix Vision. "Intelligent image processing camera with integrated 266 or 400 MHz PC". Feb. 3, 2000. "http://www.matrix-vision.com/news/print.php?ProductID=10&lang=en".*

(Continued)

*Primary Examiner* — Michael Roswell

(57) ABSTRACT

A method is disclosed for instructing a user interface (UI) in communication with a first of vision processor (VP) to establish communication with a second (VP). The invention is useful in a machine vision system having a plurality of VPs and at least one UI. The method includes the steps of providing each VP with a link function for establishing communication between a VP and a UI; and activating the link function so as to issue instructions to the UI to establish communication with another VP. The link function enables local dynamic display of a remote VP on the UI, and a dynamic connection that provides a continually updated display representing a current state of the VP connected to the UI. An operator may observe results and alter parameters on any of the VPs in the system without having to first understand the architecture of the machine vision system.

30 Claims, 9 Drawing Sheets

U.S. PATENT DOCUMENTS

| | | | |
|---|---|---|---|
| 6,167,469 A | 12/2000 | Safai et al. | |
| 6,256,662 B1 | 7/2001 | Lo et al. | |
| 6,298,474 B1 * | 10/2001 | Blowers et al. | 717/104 |
| 6,332,163 B1 | 12/2001 | Bowman-Amuah | |
| 6,342,901 B1 | 1/2002 | Adler et al. | |
| 6,343,312 B1 | 1/2002 | Yokote | |
| 6,356,932 B1 | 3/2002 | Yokote | |
| 6,400,903 B1 | 6/2002 | Conoval | |
| 6,421,069 B1 | 7/2002 | Ludtke et al. | |
| 6,750,466 B2 * | 6/2004 | Guha et al. | 250/559.46 |
| 6,931,602 B1 * | 8/2005 | Silver et al. | 715/771 |
| 2002/0184347 A1 | 12/2002 | Olsen et al. | |
| 2003/0160869 A1 | 8/2003 | Koyama | |

FOREIGN PATENT DOCUMENTS

| | | | |
|---|---|---|---|
| WO | WO 01/11445 A2 | 2/2001 | |

OTHER PUBLICATIONS

Cognex Corporation, Cognex 3000/4000/5000, Development Environment 1, Revision 7.6, Chapter 3; Communication Utilities, 1996.

Cognex Corporation, Installing the In-Sight™ 3000, 2000-2001.

Cognex Corporation, In-Sight™ 1700 Wafer Reader, User Manual, 2000-2001.

Evan Lubofsky, Cognex Corporation, Machine Vision—Moving Beyond the End of the Sensors Magazine, Aug. 2001.

Panasonic's New Network Camera Focuses on Security, Panasonic Press Room, Las Vegas, Jan. 2001.

Michael Valverde, Wake Up to the Reality of the Smart Factory, Industrial Computing Magazine, Apr. 1, 1999.

* cited by examiner

```
ACQUIRE IMAGE (...)
IF (READ BARCODE FAILS)
  LINK ("FAILURE SYSTEM")
ELSE
    •
    •
    •
   <ADDITIONAL VP FUNCTIONS>
    •
    •
    •
```

FIG. 9

SYSTEM FOR INITIATING COMMUNICATION BETWEEN A USER INTERFACE AND A VISION PROCESSOR

COPYRIGHT NOTICE

The disclosure of this patent document contains material that is subject to copyright protection. The copyright owner has no objection to the facsimile reproduction by anyone of the patent document or the patent disclosure, as it appears in the United States Patent and Trademark Office patent file or records, once a patent is issued on this application, but otherwise reserves all copyright rights whatsoever.

FIELD OF THE INVENTION

This invention relates to communication among hosts on a network, particularly to establishing communication among the hosts.

BACKGROUND OF THE INVENTION

A machine vision system includes a collection of one or more vision processors (VPs) for at least processing and interpreting images, and optionally one or more user interfaces (UIs) for at least enabling a user to interact with and/or control a VP. Each VP is connected to one or more electronic cameras through which the VP "sees" its environment, i.e., acquires an image of a scene.

Referring to FIG. 1, the UI and the VP may coexist on the same computer platform, in which case the camera 11 is connected via acquisition circuitry 12 to a general purpose processor 13 (such as a microprocessor, digital signal processor, or CPU). The general purpose processor runs a program that implements a VP 14 and a UI 15 that communicate with one another via shared memory. The UI interfaces with a user using one or more input devices (such as a control pad, a keyboard, or a mouse) via input device circuitry 16 and provides a graphical display to the user on a display device (such as an LCD display or a computer monitor) via display circuitry 17.

Alternatively, the VP and the UI may exist on separate computer systems. This configuration shares the components of the single-computer vision system, but runs the VP on a different general purpose processor from the UI. Referring to FIG. 2, the camera 21 is connected via acquisition circuitry 22 to a general purpose processor 23. This processor runs a program that implements a VP 24 and communicates via communications circuitry 25 across a communications channel 26 (such as an RS232 serial connection or an ethernet connection) to the computer running the UI. The UI computer 32 houses a general purpose processor 28 that runs a program implementing the UI 29. The UI communicates with the VP computer via communications circuitry 27 and the communications link 26. A user may control the UI via one or more input devices connected to the input device circuitry 30 and view graphical output via display circuitry 31 on a display device.

Referring to FIG. 3, if the communications channel provides access to a network, several additional connection schemes are also possible: each UI 35 can communicate via that network 36 with one of many networked VPs 37, 38, 39. When a user (either a developer who will configure a VP for a specific vision task, or an operator who will monitor the system during the operation phase) desires to communicate with a particular VP, the user selects the new VP from a list provided by the UI and instructs the UI to establish a connection. In this way, many UIs may control each VP, and each UI may control many VPs. A collection of VPs may work together to solve a complex vision problem—in this case the each VP in the collection solves a particular subset of the overall vision problem.

There are three modes of operation of a vision system, during which different actions take place on the UI and VP:
1. Connection—using the UI, the developer or the operator selects a VP from a list of all available VPs, possibly displayed in a menu by the UI. The UI establishes initial communications with the VP. The connection phase establishes data communications between the UI and the VP. One embodiment of such a data connection is an application layer connection (possibly using a client/server model) in the OSI communication model.
2. Configuration—through the UI, the developer configures the connected VP for a specific vision task.
3. Operation—the VP executes the sequence of functions defined by the developer during the configuration phase. The UI may be used by an operator to monitor the outputs of the VP, or may be disconnected from the VP, allowing the VP to run standalone.

With reference to FIG. 4, when designing a vision application, a developer typically connects to a specific VP 41 and then performs one or more cycles of configuration 42 and operation 43. After the developer is satisfied with the configuration of the first VP, the developer may connect to a second VP 44 and complete a cycle of configuration 45 and operation 46 of that system. This process may be repeated for additional VPs.

Once the developer has properly configured the vision system, an operator will monitor the functioning system and notify the developer of problems with the vision system configuration that must be corrected. The operator may only make changes to parameters in the system configuration to maintain the functioning of the vision system. For example, the operator may specify a region of interest of an image to guide the behavior of VP functions. In order to make the system accessible to the operator, the developer must implement visual feedback and allow constrained user interaction.

However, known UIs have a critical limitation: when monitoring a multi-VP vision system, the operator of the system must explicitly select each VP for observation, and must therefore posses developer-level knowledge of the structure and organization of the entire multi-VP vision system. To adjust the parameters of a multi-VP vision system, the operator must understand how the vision application is distributed among the plurality of VPs of the vision system so that parameters on each VP may be observed and modified as appropriate. It is very burdensome for an operator to satisfy this requirement, and it is also burdensome for a developer to attempt to reduce the burden on the operator as part of the development task.

SUMMARY OF THE INVENTION

In one general aspect, the invention is useful in a machine vision system having a plurality of vision processors (VPs) and at least one user interface (UI). The invention is a method for instructing a UI in communication with a first VP to establish communication with a second VP. The method includes the steps of providing each VP with a link function for establishing communication between a VP and a UI; and activating the link function so as to issue instructions to the UI to establish communication with another VP.

The step of activating the link function can include the step of activating a VP control. Activating a VP control can include clicking on a graphical representation of the VP control using, for example, a mouse. The graphical representation of the VP control can be an underlined text string displayed by a UI.

In another preferred embodiment, activating a VP control includes providing an activation signal to the VP control. The activation signal can be initiated by a user, possibly via the UI. For example, the UI can a check box, or a radio button.

In an alternate preferred embodiment, the activation signal is initiated by an external event. The external event can be an industrial process event. Or, the activation signal can be initiated by a change in the state of a sensor. The activation signal can also be initiated by a programmatic decision, or a human decision.

In another preferred embodiment, activating the link function includes including the link function in a function execution sequence of the VP.

The link function can also terminate communication with a first VP in addition to, or in the alternative to, establishing communication with a second VP.

The link function enables local dynamic display of a remote VP on the UI. Also, upon activation of the link function, a dynamic connection is established that provides a continually updated display representing a current state of the VP connected to the UI.

In yet another preferred embodiment, upon activation of the link function, a user is enabled to configure the VP using the UI.

In another general aspect of the invention, in a machine vision system having a plurality of vision processors (VPs) and at least one user interface (UI), a method is provided for instructing a UI in communication with a first VP to establish communication with a second VP. The method includes providing a graphical representation, included in the UI, wherein the graphical representation is adapted to initiate an activation signal that causes the VP to instruct the UI to establish communication with the second VP.

In a preferred embodiment, the plurality of VPs and the at least one UI are interconnected via a network, where the network may support a TCP/IP network protocol. Also, the graphical representation may be adapted to be responsive to user action, such as a mouse click upon the graphical representation. The graphical representation can be an underlined text string.

In yet another general aspect of the invention, a user interface (UI) is provided for a machine vision system having a plurality of vision processors (VPs). The user interface includes a spread sheet; and a graphical representation, where the graphical representation is incorporated in the spreadsheet, and the graphical representation is adapted to respond to user action so as to cause the VP to instruct the UI to establish communication with a VP of the plurality of VPs. In a preferred embodiment, the graphical representation is further adapted to respond to user action so as to cause the UI to terminate communication with a VP of the plurality of VPs. As in other embodiments, the graphical representation can be an underlined text string, or can be an iconic representation.

In a further general aspect of the invention, a machine vision system is provided that includes a plurality of vision processors (VPs); at least one user interface (UI) in communication with a first VP of the plurality of VPs. The UI includes a graphical representation visible to a user, the graphical representation being adapted to respond to user action so as to cause the VP to instruct the UI to establish communication with a second VP of the plurality of VPs. In a preferred embodiment, the plurality of VPs and the at least one UI are interconnected via a network. The network may support a TCP/IP network protocol.

In yet another general aspect, the invention is a method for enabling a VP to instruct a UI connected to it to reconnect to a different VP, thereby facilitating the implementation of a flexible monitoring system that functions optimally within the structure of a vision system comprised of a collection of VPs. In another general aspect, the invention is an extension to the existing application protocol used to communicate between the UI and the VP, and is compatible with any application protocol that provides a framework for issuing and interpreting commands, and that is extensible in the sense that a new command may be added. This extension takes the form of a command from the VP to the UI: the specific contents of the command, and when the command is issued, are both configurable by the developer. The command is designed as a simple extension to the existing application protocol, and may take the form of any stream of bytes transferred from the VP to the UI that is compatible with the protocol, and interpretable by the UI. This allows the developer to embed knowledge about which VPs are associated with particular parameters, and to provide a seamless multi-VP application. The operator may observe results and alter parameters on any of the VPs in the system without having to first understand the architecture of the vision system.

BRIEF DESCRIPTION OF THE DRAWING

The invention will be more fully understood from the following detailed description, in conjunction with the following figures, wherein:

FIG. 9 is a block diagram showing the execution of a Link function as a member of a sequence of VP functions.

DETAILED DESCRIPTION OF THE INVENTION

The operation of any VP may be decomposed into the sequenced execution of a set of functions. A typical VP operation cycle may consist of the execution of three functions, for example:
1. AcquireImage, a function which reads an image from a digital camera connected to the VP
2. ReadBarcode, a function which locates and decodes a UPC barcode represented in the image.

3. WriteSerial, a function which writes the decoded string to an external computer or device via an RS232 serial port built into the VP The function names (italics) are completely arbitrary and need not be explicitly represented on the VP.

Each function may have one or more parameters: the function produces a result based on some combination of its input parameters. For example, a mathematical function named cos might have a single parameter and as its result generate the cosine of the angle specified by its (numeric) parameter. A more complex function, binarize might take a single parameter corresponding to a two-dimensional grayscale image and produce as its result the two-dimensional black-and-white image that most closely approximates the parameter image. The parameters of any function may be constants, or may be the results of other functions.

In addition to standard functions that merely transform parameters to results, there are two other classes of functions important to all VPs: input functions and output functions. Input functions read information from hardware devices: their results vary depending on the state of these devices. A centrally important function for any machine vision system is one that acquires an image from a camera (the AcquireImage function described earlier): in this case the function's result is an image that closely approximates the state of the imaging device or sensor when the function was executed. Other input functions may read, via specialized devices, the states of digital input lines, data sent on a serial port or ethernet network, or any other external entity that may be connected to a compatible input device.

Like input functions, output functions interact with specialized hardware devices. However, their behavior is to assert a state upon the connected external entity. The particular state that each function asserts is based on its parameters: a function WriteSerial may take a single input parameter, a string of text characters, and cause that string of characters to be written out through the system's serial port. Other output functions might assert particular voltage levels onto individual output control lines, write data out through an ethernet network, or cause the UI to display graphics (intended to communicate to a user about the values of the function's parameters).

Figure 5:
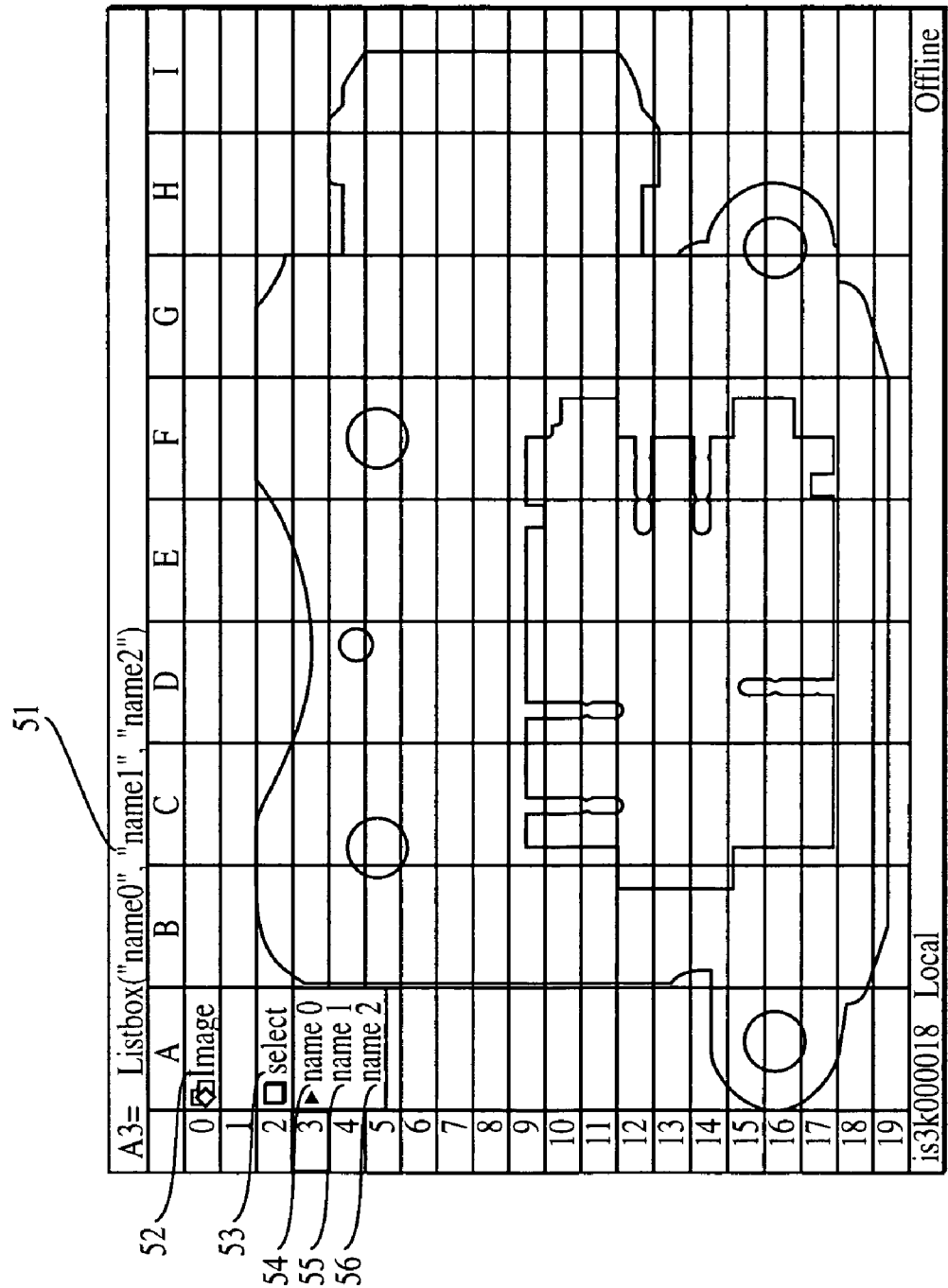
FIG. 5 shows how a preferred UI embodiment displays VP functions during the configuration and operation phases.

Functions may also have a combination of input and output behaviors. These functions, referred to as control functions, direct the UI to display a particular graphical item, and produce a result when the UI informs the VP that the user has interacted with the item. FIG. 5 shows examples of UI functions displayed by a preferred implementation of the UI. Three functions are displayed, AcquireImage 52 which returns a result of type Image, the control function checkbox 53 with the displayed label "select", and the control function ListBox, shown configured with three string elements "name0", "name1", and "name2". In this example, the user is in the process of selecting a string element from the ListBox. To do this, the user places the light-colored cursor 54 on top of the ListBox function and selects the function (by clicking a mouse button). This causes the function name and its associated parameters to be displayed at the top of the screen 51, and expands the list 55 specified by the function's parameters. When the user is satisfied with the selection one of the three options, double-clicking the mouse will terminate interaction with the control function, and the VP will be updated according to the selected value. In a similar manner, clicking on the graphical representation of the CheckBox function 53 will toggle the state of the checkbox and cause the VP to be updated according to the current state of the checkbox.

Figure 7:
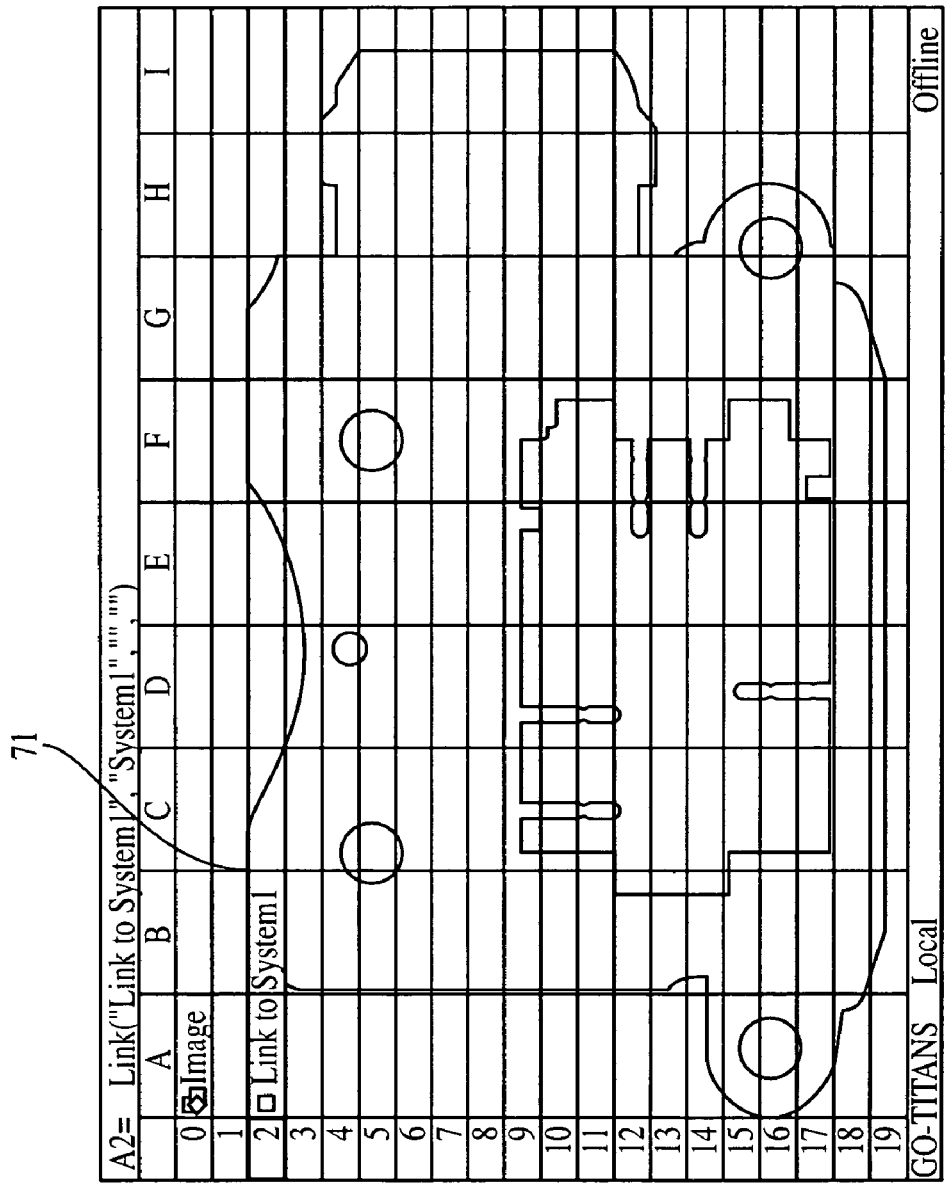
FIG. 7 shows a preferred implementation of the Link function as a user control.

One general aspect of the invention is a new type of control function named Link. When executed by a VP, the Link function sends a command specifiying another VP to the currently-connected UI. Upon receiving this command, the UI disconnects from the current VP and opens a connection to the specified VP. The Link function may be implemented as a control function: as shown in FIG. 7, the user clicks on a graphical representation of the Link function 71 which causes execution of the function.

The control function aspect of the Link function of the invention is to be distinguished from the network hyperlink capability found in Web browsers and many other modern software packages (such as Microsoft Word and Excel). The main difference is that in the case of hyperlinks, the hyperlink contains a reference to a remote computer file that is transferred to the local machine. The fundamental model of the hyperlink is that of local processing and display of distributed data. When a hyperlink is selected, a static snapshot of a remote data set (in many cases a static computer file such as an HTML file) is transferred to the local system for display. In contrast, the fundamental model of a networked vision system of the invention is local dynamic display of a remote vision processing system. When the user selects a Link of the invention, a dynamic connection is established that provides a continually updated display that represents the current state of the VP connected to the UI and simultaneously permits user configuration of the VP using the UI.

The Link function may also be executed "automatically" by the VP when an appropriate condition is met. For example, it may be important for the operator to immediately view the state of another VP when a particular string is read by the ReadBarcode function. Running the Link function when such a condition occurs will cause any currently-connected UI to reconnect to the other VP (see FIG. 9). This mode of operation is a capability unavailable to the hyperlink to Web browsers and similar software packages.

Execution of the Link function may also be driven by an external causal agent communicating with the VP via a communications channel distinct from the UINP channel. In a preferred implementation of a VP, the VP supports the Telnet protocol (in addition to the protocol used for communications with a UI), which provides a mechanism for an external agent to cause execution of specific functions on the VP. The external causal agent may cause execution based on one or more of the following events:

a change in the state of a sensor, such as an optical proximity sensor, a mechanical switch, or a through-beam sensor a programmatic decision based on the mechanical, electrical, or software state of a computer or other machine a human decision indicated by typing a command, closing an electrical connection, or any other method of human-machine interaction, such as clicking on a check box or a radio button.

Figure 8A:
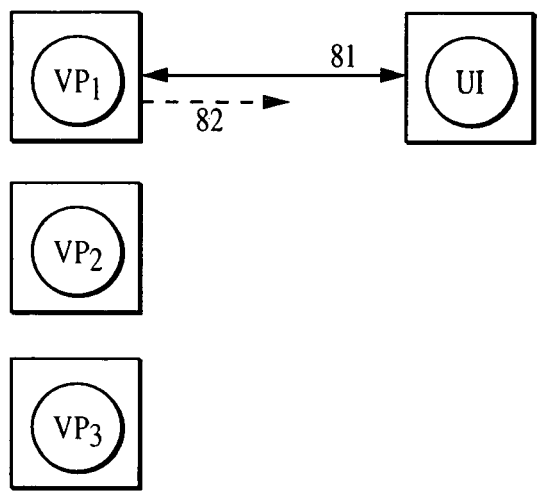
FIG. 8 is a block diagram showing the execution of a Link function.
Figure 8B:
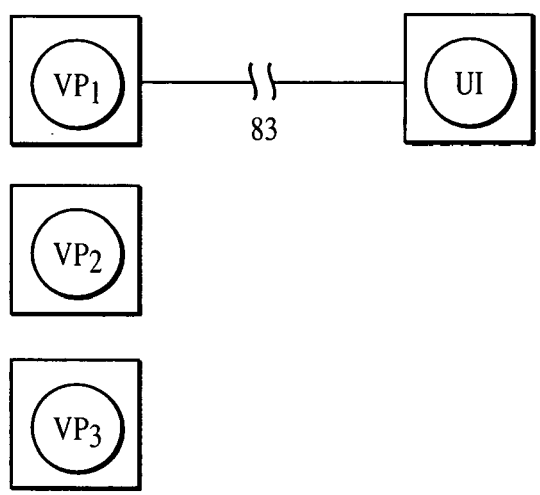
Figure 8C:
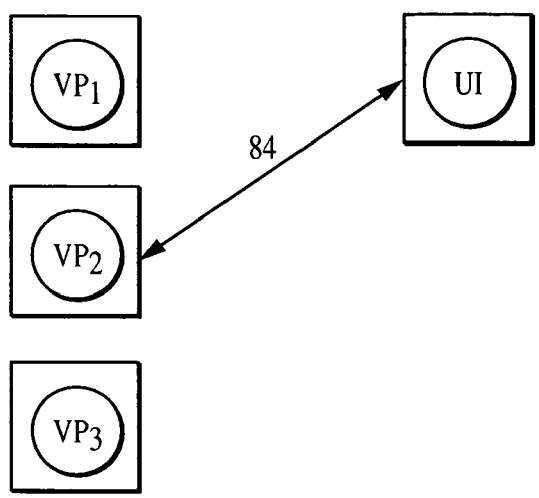

As described earlier, the Link function may be caused to execute either by a user selecting the graphical control component of the Link function 71 of FIG. 7, or by placing the function in the sequence of functions that define the operation of the VP. The Link function operates within the framework of an existing application protocol by issuing a command from the VP to the UI. As such, it represents an extension to an existing application protocol. Regardless of how the function is caused to execute, execution of the Link function begins the following sequence of events (also shown in FIG. 8):

1. The UI is connected to one of several possible VPs 81.
2. Execution of Link function (caused by user action or programmed action)

3. Command issued to UI 82. Command includes
   Identifier of new VP (for example, the IP address or machine name)
   Optional: system-dependent description of the view for the new VP
   Optional: cursor position for the new VP The command may be encoded as any stream or packet of bytes interpretable by the UI. For example, in a text-based application protocol, the command may take the form of the string
   Reconnect(<address>,<view>,<cursor-position>),
where <address>,<view>, and <cursor-position>are text strings that uniquely identify each command parameter. The VP-issued command Reconnect("system2","","") would cause the UI to reconnect to a VP named "system2" with default view and cursor positions.

4. UI receives the command
5. UI disconnects from current VP 83—this step is also optional since a UI may be simultaneously connected to more than one VP.
6. UI connects to specified VP 84 using the implemented application layer protocol.
7. UI adjusts its view of the VP and sets the cursor position if the optional components of the command were included.

Figure 6:
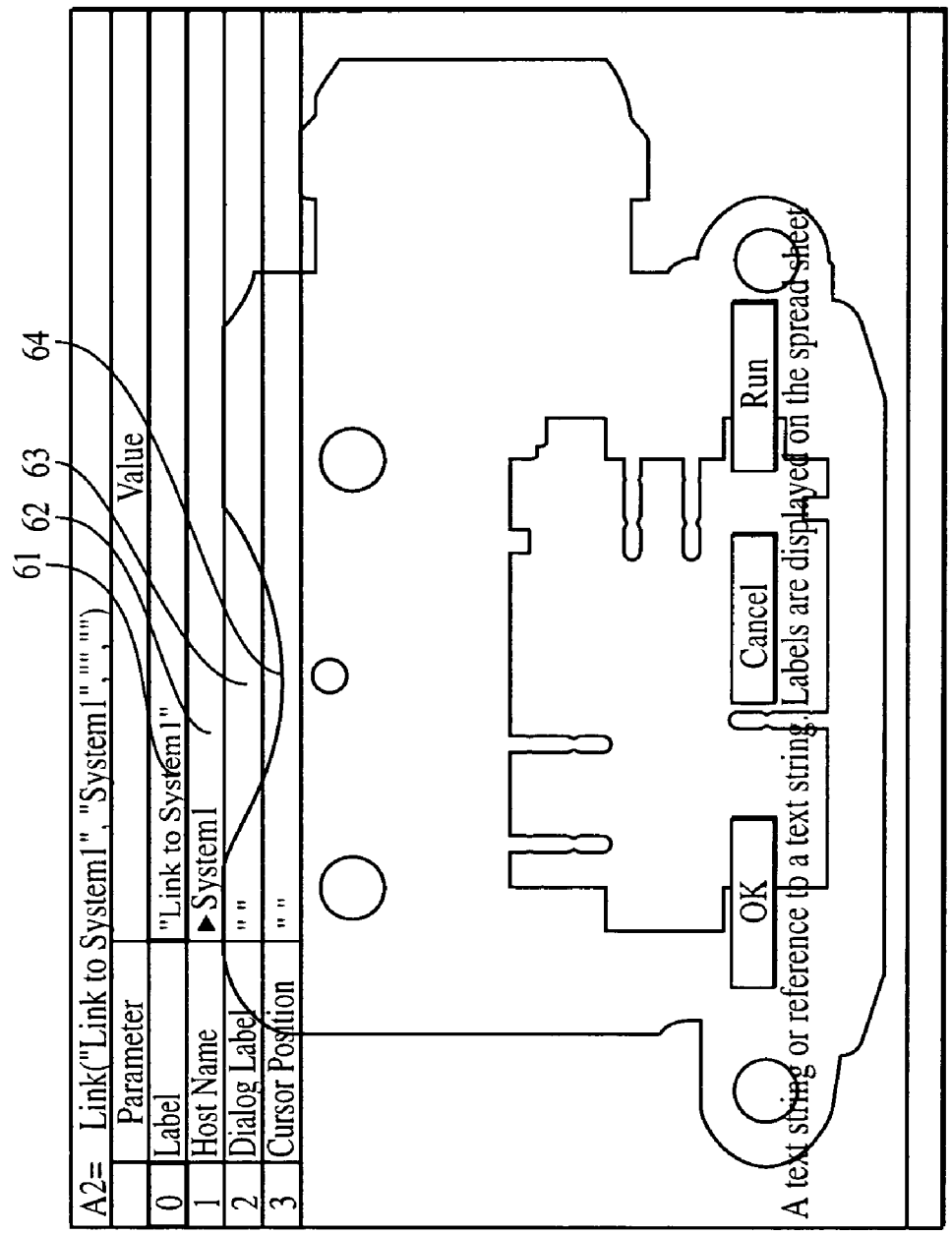
FIG. 6 shows the configuration of a preferred implementation of the Link function.

In a preferred embodiment, the Link function has four parameters, shown in FIG. 6. Label 61 is a string that is displayed when the Link function is configured as a control function 71 (FIG. 7). Host Name 62 is a symbolic identifier, VP name, or network IP address that uniquely identifies the new VP. Dialog Label 63 is a string that defines the graphical view of the new VP. Cursor Position 64 defines the cursor position within that graphical view. Together Dialog Label and Cursor Position describe the display produced by the UI following connection to the specified VP. The details of how these parameters control the UI display depend completely on the specific implementation of the UI.

Figure 1:
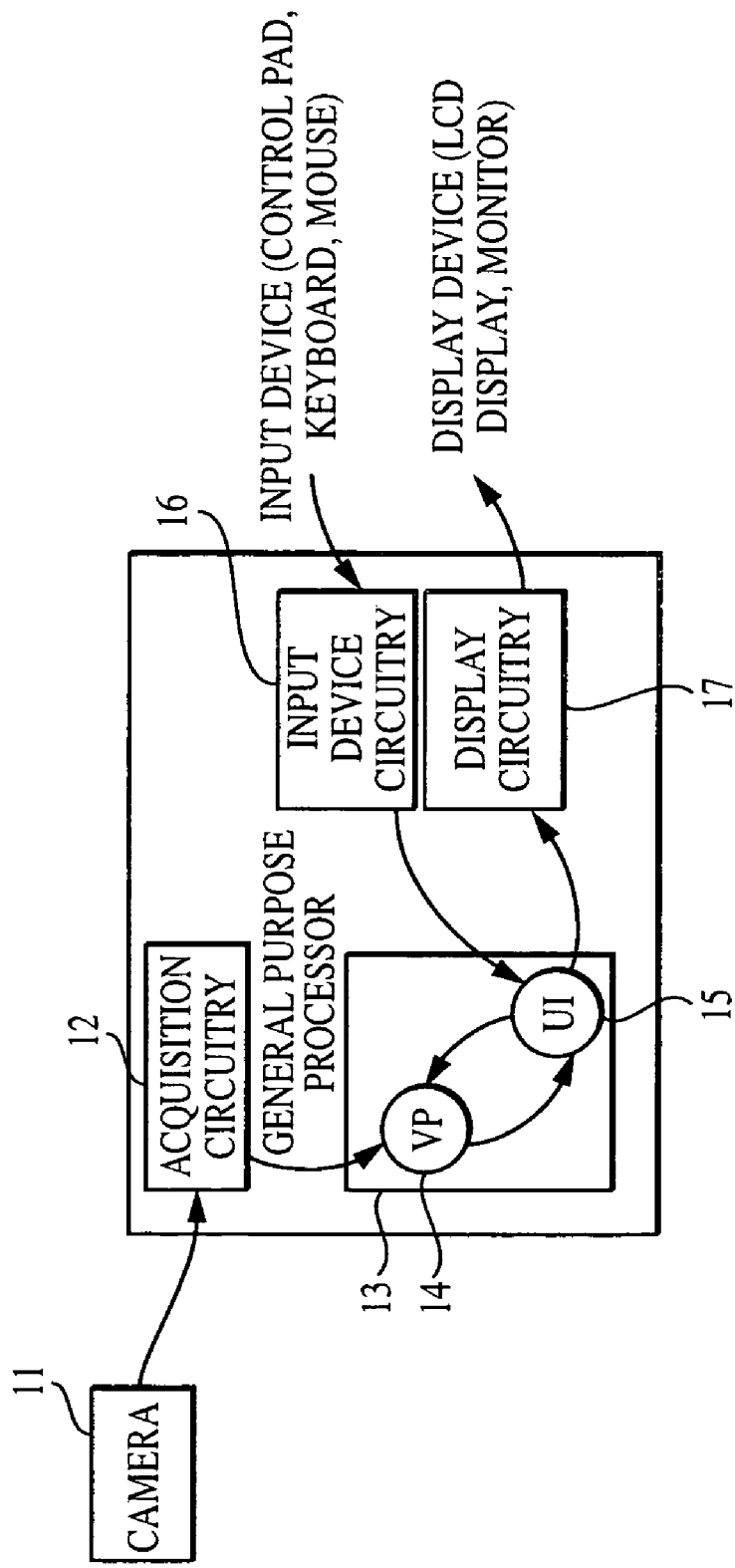
FIG. 1 is a block diagram showing a standalone machine vision system in which both the vision processor and the user interface are realized in a single computer.
Figure 2:
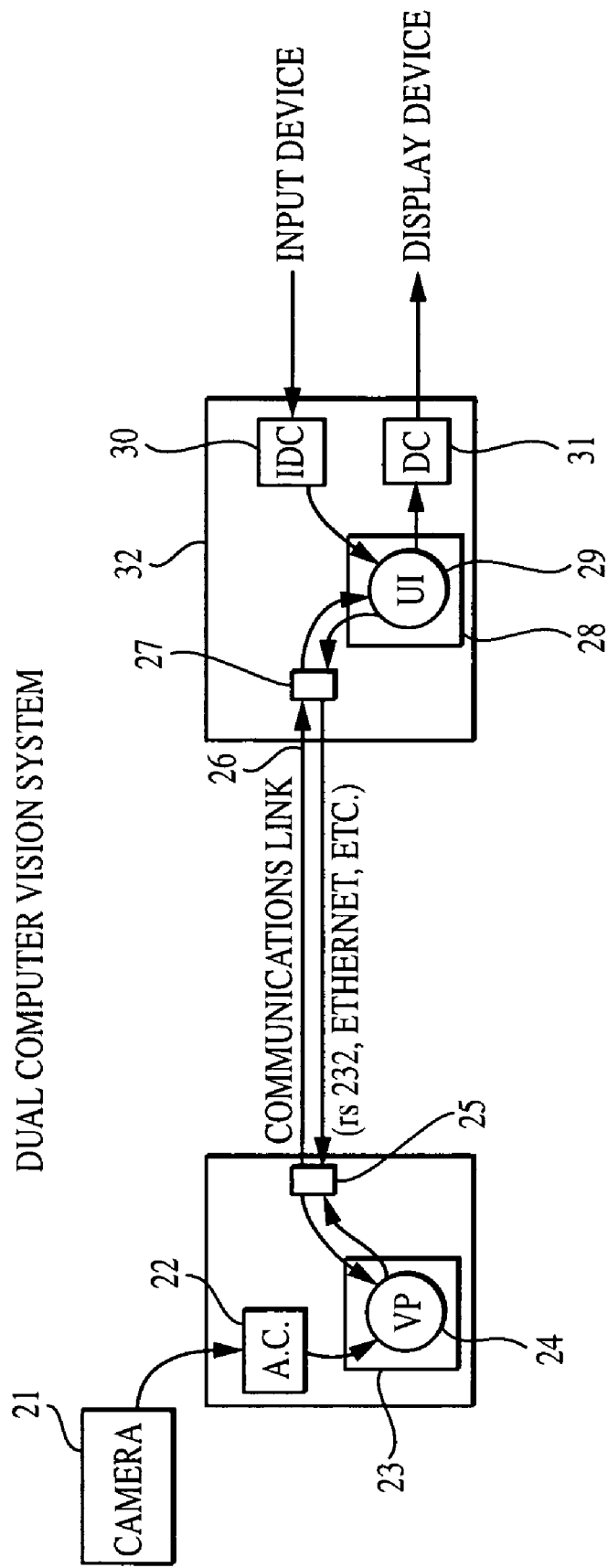
FIG. 2 is a block diagram showing a machine vision system comprised of a user interface computer connected with a vision processor computer via a general-purpose communications link.
Figure 3:
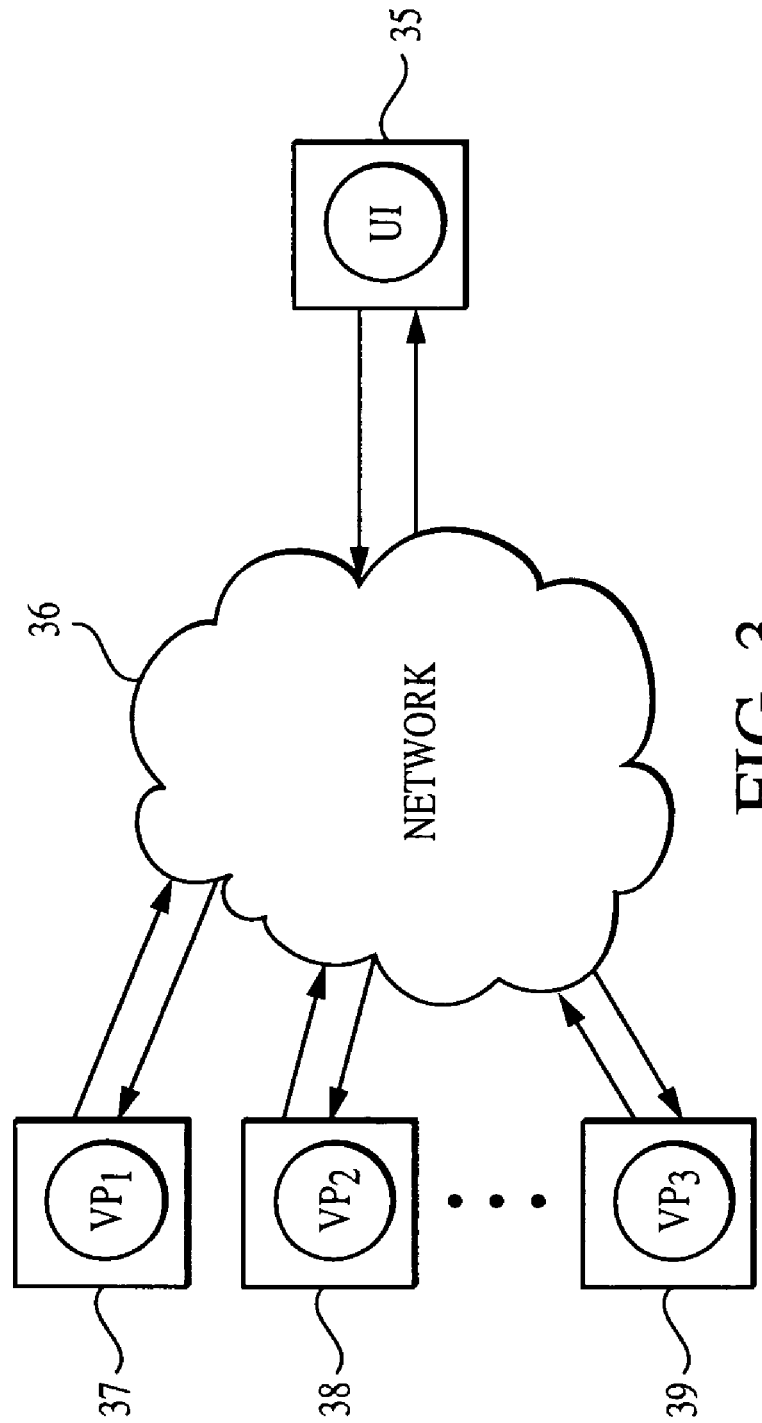
FIG. 3 is a block diagram showing a networked machine vision system comprised of a plurality of vision processor computers connected via a network to a user interface computer.
Figure 4:
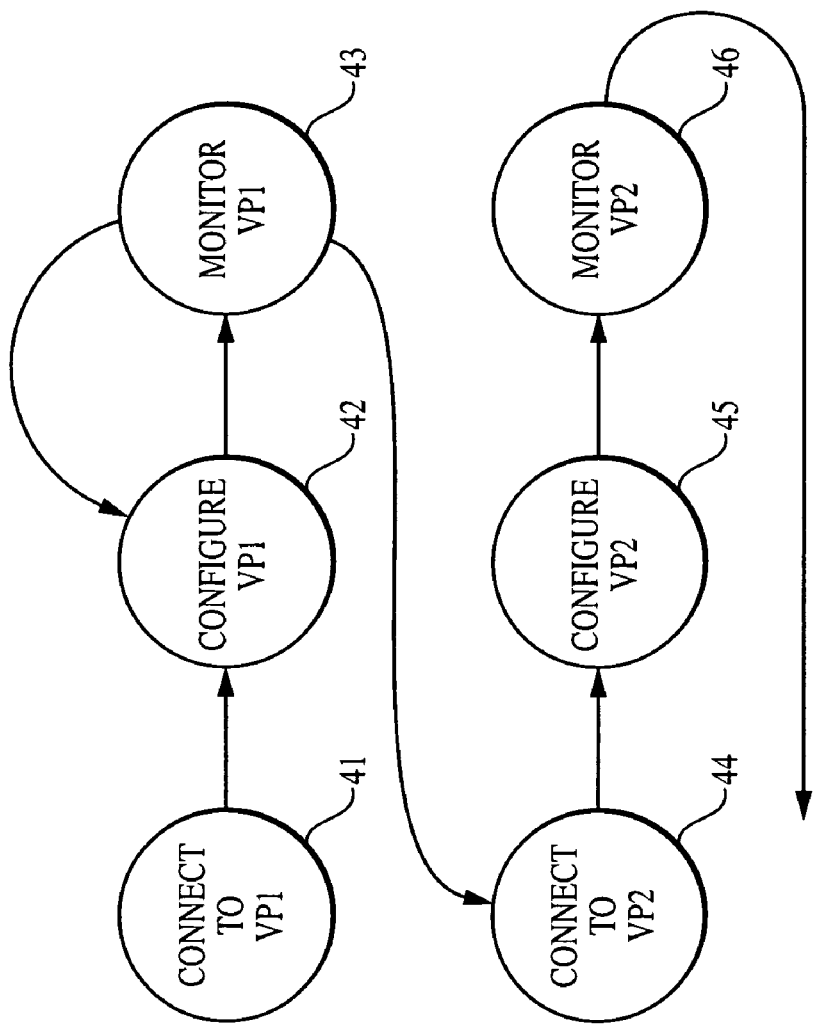
FIG. 4 shows the sequence of operations performed by a developer setting up a two-VP vision system.

Although the preferred implementation of both UI and VP utilize OSI application layer communications over an TCP/IP 10/100-base-T ethernet network, the invention applies equally to any application layer protocol running on any communications medium. Other types of networks (including ATM, wireless networks, and gigabit ethernet) are compatible with this invention as well. Furthermore, a single UI could be connected via a dedicated communications channel (such as an RS232 serial channel), as shown in FIG. 2 to each of several VPs. In such a configuration, the invention could be used to change or establish a logical connection of the UI to one of the VPs in a manner equivalent to the connection phase of the UI to a VP on a network.

Other modifications and implementations will occur to those skilled in the art without departing from the spirit and the scope of the invention as claimed. Accordingly, the above description is not intended to limit the invention except as indicated in the following claims.

What is claimed is:

1. In a machine vision system having a plurality of distinct and separate vision processors (VPs), each VP being on a respective VP computing platform, and at least one distinct and separate machine vision user interface (UI), the at least one distinct and separate machine vision UI being on a respective distinct and separate machine vision UI computing platform, a method for instructing a machine vision UI in communication with a first distinct and separate VP to establish communication with a second distinct and separate VP, the method comprising:
   providing a first distinct and separate VP with a link function, the first distinct and separate VP being on a first respective distinct and separate VP computing platform connected to a network, the link function being a control function executable by the first distinct and separate VP,
   the link function being both for enabling a user to configure any second distinct and separate VP connected to the network using the at least one distinct and separate machine vision UI on a respective distinct and separate machine vision UI computing platform connected to the network, and for establishing communication via the network between the any second distinct and separate VP of the plurality of VPs and the at least one distinct and separate machine vision UI on the respective distinct and separate machine vision UI computing platform, the any second distinct and separate VP being on a second respective distinct and separate VP computing platform,
   the communication via the network established by the link function enabling a continually updated image display on the at least one distinct and separate machine vision UI representing a current state of the any second distinct and separate VP connected to the network;
   executing the link function so as to issue instructions via the network from the first distinct and separate VP to the distinct and separate machine vision UI to establish communication via the network with the any second distinct and separate VP; and
   performing at least part of a machine vision task configured by the at least one distinct and separate machine vision UI, using at least one of the first distinct and separate VP and the any second distinct and separate VP, in accordance with the instructions issued by the first distinct and separate VP upon execution of the link function.

2. The method of claim 1, wherein the link function includes:
   a VP control function having a plurality of parameters, including at least an identifier of the second VP.

3. The method of claim 1, wherein executing the link function includes:
   clicking on a graphical representation of the link function displayed by the machine vision UI.

4. The method of claim 3, wherein the graphical representation of the link function is an underlined text string displayed by the machine vision UI.

5. The method of claim 1, wherein instructions from the first VP to the machine vision UI includes:
   a plurality of parameters, including at least an identifier of the second VP, and at least one of a description of a view of the second VP, and a cursor position of the second VP.

6. The method of claim 1, wherein executing the link function is initiated by a user.

7. The method of claim 6, wherein executing the link function is initiated by a user via the at least one machine vision UI.

8. The method of claim 7, wherein the at least one machine vision UI includes a check box.

9. The method of claim 7, wherein the at least one machine vision UI includes a radio button.

10. The method of claim 1, wherein executing the link function is initiated by an external event.

11. The method of claim 10, wherein the external event is an industrial process event.

12. The method of claim 10, wherein the external event is a change in the state of a sensor.

13. The method of claim 1, wherein executing the link function is initiated by a programmatic decision.

14. The method of claim 1, wherein executing the link function is initiated by a human decision.

15. The method of claim 1, wherein executing the link function includes:
  including the link function in a function execution sequence of the VP.

16. The method of claim 1, wherein the link function also terminates communication with the first VP in addition to establishing communication with the second VP.

17. The method of claim 1, wherein the link function enables local dynamic display of images provided by a camera of the second VP on the at least one machine vision UI.

18. In a machine vision system having a plurality of distinct and separate vision processors (VPs), each VP being on a respective distinct and separate VP computing platform and at least one distinct and separate machine vision user interface (UI), the at least one distinct and separate machine vision UI being on a respective distinct and separate machine vision UI computing platform, a method for instructing a machine vision UI in communication with a first distinct and separate VP to establish communication with a second distinct and separate VP, the method comprising:
  providing a graphical representation, included in the at least one distinct and separate machine vision UI, the graphical representation being adapted to respond to user action so as to cause the first distinct and separate VP on a first respective distinct and separate VP computing platform connected to a network to instruct the at least one distinct and separate machine vision UI on a respective distinct and separate machine vision UI computing platform connected to the network to establish communication via the network with any second distinct and separate VP on a second respective distinct and separate VP computing platform connected to the network,
  the communication via the network enabling a continually updated image display on the at least one distinct and separate machine vision UI representing a current state of the any second distinct and separate VP, and enabling a user to configure the any second distinct and separate VP using the distinct and separate machine vision UI; and
  performing at least part of a machine vision task configured by the at least one distinct and separate machine vision UI, using at least one of the first distinct and separate VP and the any second distinct and separate VP, in accordance with the instructions issued by the first distinct and separate VP.

19. The machine vision system of claim 18, wherein the network supports a TCP/IP network protocol.

20. The machine vision system of claim 18, wherein the user action includes selecting the graphical representation.

21. The machine vision system of claim 18, wherein the user action is a mouse click upon the graphical representation.

22. The machine vision system of claim 18, wherein the graphical representation is an underlined text string.

23. A user interface (UI) for a machine vision system having a plurality of distinct and separate vision processors (VPs) including a first distinct and separate VP on a first respective distinct and separate VP computing platform, and a second distinct and separate VP on a second respective distinct and separate VP computing platform, the user interface comprising:
  a spread sheet; and
  a graphical representation, the graphical representation being incorporated in the spreadsheet, the graphical representation being adapted to respond to user action so as to cause a first distinct and separate VP on a first respective distinct and separate VP computing platform to instruct the UI to establish communication via a network with any second distinct and separate VP of the plurality of VPs on a second respective distinct and separate VP computing platform, the communication via the network enabling a continually updated image display on the UI representing a current state of the any second distinct and separate VP, and enabling a user to configure the any second distinct and separate VP using the at least one UI;
  wherein at least one of the first distinct and separate VP and the any second distinct and separate VP performs at least part of a machine vision task in accordance with the instructions issued by the first distinct and separate VP, the machine vision task being configured by the at least one distinct and separate machine vision UI.

24. The user interface (UI) of claim 23, wherein the graphical representation is further adapted to respond to user action so as to cause the UI to terminate communication with the first VP of the plurality of VP.

25. The user interface (UI) of claim 23, wherein the graphical representation is an underlined text string.

26. The user interface (UI) of claim 23, wherein the graphical representation is an ionic representation.

27. A machine vision system comprising:
  a plurality of distinct and separate vision processors (VPs), each VP being on a respective distinct and separate VP computing platform connected to a network;
  at least one distinct and separate machine vision user interface (UI), the at least one distinct and separate machine vision user interface (UI) being on a respective distinct and separate machine vision UI computing platform connected to the network, the machine vision UI being in communication via the network with a first distinct and separate VP of the plurality of VPs on a first respective distinct and separate computing platform, the machine vision UI including:
  a graphical representation visible to a user, the graphical representation being adapted to respond to user action so as to cause the first distinct and separate VP to instruct the distinct and separate machine vision UI to establish communication via the network with any second distinct and separate VP of the plurality of VPs on a second respective distinct and separate computing platform, the communication via the network enabling a continually updated image display on the distinct and separate machine vision UI representing a current state of the any second VP, and enabling a user to configure via the network the any second distinct and separate VP using the distinct and separate machine vision UI;
  wherein at least one of the first distinct and separate VP and the any second distinct and separate VP performs at least part of a machine vision task in accordance with the instructions issued by the first distinct and separate VP, the machine vision task being configured by the at least one distinct and separate machine vision UI.

28. The machine vision system of claim 27, wherein the network supports a TCP/IP network protocol.

29. The machine vision system of claim 27, wherein user action is a mouse click upon the graphical representation.

30. The machine vision system of claim 27, wherein the graphical representation is an underlined text string.

* * * * *